United States Patent
Ohno et al.

(10) Patent No.: US 9,794,604 B2
(45) Date of Patent: Oct. 17, 2017

(54) SYSTEMS AND METHODS FOR TRANSMITTING SEGMENT-QUALITY UNITS OF A STREAMING VIDEO SESSION

(71) Applicant: Panopto, Inc., Seattle, WA (US)

(72) Inventors: Hiroshi Ohno, Bellevue, WA (US); Eric Burns, Seattle, WA (US); Timothy R. Sullivan, Seattle, WA (US); Zac Rumford, Seattle, WA (US)

(73) Assignee: Panopto, Inc., Seattle, WA (US)

( * ) Notice: Subject to any disclaimer, the term of this patent is extended or adjusted under 35 U.S.C. 154(b) by 0 days.

(21) Appl. No.: 14/942,917

(22) Filed: Nov. 16, 2015

(65) Prior Publication Data
US 2016/0142752 A1    May 19, 2016

Related U.S. Application Data

(60) Provisional application No. 62/079,934, filed on Nov. 14, 2014.

(51) Int. Cl.
H04N 7/173 (2011.01)
H04N 21/24 (2011.01)
H04N 21/2343 (2011.01)
H04N 21/845 (2011.01)

(52) U.S. Cl.
CPC .. H04N 21/2402 (2013.01); H04N 21/234345 (2013.01); H04N 21/234363 (2013.01); H04N 21/845 (2013.01); H04N 21/8456 (2013.01)

(58) Field of Classification Search
None
See application file for complete search history.

(56) References Cited

U.S. PATENT DOCUMENTS

| | | | | |
|---|---|---|---|---|
| 6,230,162 B1* | 5/2001 | Kumar | ............ | G06F 17/30905 348/E7.071 |
| 2002/0144262 A1* | 10/2002 | Plotnick | ............ | G11B 27/005 725/32 |
| 2007/0154163 A1* | 7/2007 | Cordray | ............ | H04N 21/6187 386/278 |
| 2008/0141317 A1* | 6/2008 | Radloff | ............. | H04N 5/44582 725/87 |
| 2010/0235472 A1* | 9/2010 | Sood | ................... | H04L 65/4092 709/219 |
| 2010/0235528 A1* | 9/2010 | Bocharov | .......... | H04N 21/6437 709/231 |
| 2011/0219098 A1* | 9/2011 | Xu | .......................... | H04L 67/06 709/219 |
| 2012/0047542 A1* | 2/2012 | Lewis | ............. | H04N 21/44016 725/97 |
| 2012/0144445 A1* | 6/2012 | Bonta | ................. | H04L 12/1868 725/116 |

(Continued)

FOREIGN PATENT DOCUMENTS

WO    WO2015/015140 A1 *    2/2015    ......... H04N 21/231

Primary Examiner — An Son P Huynh
(74) Attorney, Agent, or Firm — Perkins Coie LLP

(57) ABSTRACT

Systems and methods are provided for providing streaming video to a client computer. A system includes a broadcast sender configured to provide a plurality of video segments at each of a plurality of quality levels as segment-quality units. A load balancer is configured to transmit the segment-quality units to one of a plurality of upload servers. The upload servers are configured to update a record of received segment-quality units, and to generate updates for a streaming video manifest corresponding to the streaming video.

14 Claims, 4 Drawing Sheets

(56) References Cited

U.S. PATENT DOCUMENTS

| | | | | |
|---|---|---|---|---|
| 2012/0158985 A1* | 6/2012 | Patten | H04L 67/108 | 709/231 |
| 2012/0314761 A1* | 12/2012 | Melnyk | H04L 65/605 | 375/240.02 |
| 2013/0067052 A1* | 3/2013 | Reynolds | H04L 67/02 | 709/223 |
| 2013/0091521 A1* | 4/2013 | Phillips | H04N 21/23424 | 725/35 |
| 2013/0159388 A1* | 6/2013 | Forsman | H04N 21/64322 | 709/203 |
| 2014/0086445 A1* | 3/2014 | Brubeck | H04N 21/23439 | 382/100 |
| 2014/0129618 A1* | 5/2014 | Panje | H04N 21/26258 | 709/203 |
| 2014/0143440 A1* | 5/2014 | Ramamurthy | H04N 21/23439 | 709/231 |
| 2014/0280906 A1* | 9/2014 | Johns | H04L 45/28 | 709/224 |
| 2014/0281009 A1* | 9/2014 | Moorthy | G06F 17/30017 | 709/231 |
| 2014/0282262 A1* | 9/2014 | Gregotski | H04N 21/2387 | 715/838 |
| 2015/0007239 A1* | 1/2015 | Cranman | H04N 21/2402 | 725/95 |
| 2015/0067722 A1* | 3/2015 | Bjordammen | H04N 21/2625 | 725/32 |
| 2015/0089554 A1* | 3/2015 | Phillips | H04N 21/26258 | 725/92 |
| 2015/0180924 A1* | 6/2015 | O'Callaghan | H04L 65/605 | 709/219 |
| 2015/0256906 A1* | 9/2015 | Jones | H04L 65/4076 | 725/109 |
| 2015/0325268 A1* | 11/2015 | Berger | G11B 27/19 | 386/248 |
| 2016/0182941 A1* | 6/2016 | Crabtree | H04N 21/23106 | 725/115 |
| 2016/0191985 A1* | 6/2016 | Tirpak | H04N 21/4331 | 725/46 |

* cited by examiner

FIG. 4

Table 400:

| QUALITY | SEGMENT | | | | | | | | | |
|---|---|---|---|---|---|---|---|---|---|---|
| | 1 | 2 | 3 | 4 | 5 | 6 | 7 | 8 | 9 | 10 |
| 1.5 M | X | X | X | | | | | | | |
| 750K | X | X | | | | | | | | |
| 300K | X | X | X | | X | | | | | |

Table 450:

| QUALITY | SEGMENT | | | | | | | | | |
|---|---|---|---|---|---|---|---|---|---|---|
| | 1 | 2 | 3 | 4 | 5 | 6 | 7 | 8 | 9 | 10 |
| 1.5 M | (1, 1.5M) | (2, 1.5M) | (3, 1.5M) | Fill | (5, 300K) | | | | | |
| 750K | (1, 750K) | (2, 750K) | (3, 300K) | Fill | (5, 300K) | | | | | |
| 300K | (1, 300K) | (2, 300K) | (3, 300K) | Fill | (5, 300K) | | | | | |

SYSTEMS AND METHODS FOR TRANSMITTING SEGMENT-QUALITY UNITS OF A STREAMING VIDEO SESSION

CROSS-REFERENCE TO RELATED APPLICATION(S)

This application claims priority to U.S. Patent Application No. 62/079,934, filed Nov. 14, 2014, which is incorporated herein by reference in its entirety.

TECHNICAL FIELD

The present technology relates generally to systems and methods for transmitting segment-quality units of a streaming video session to one or more client computers.

BACKGROUND

As bandwidth availability increases, streaming content, including streaming video, has become more and more prevalent. Viewers often prefer to view content at the highest available quality, and streaming at the preferred quality requires a minimum bandwidth. While bandwidth sufficient for the preferred video quality may be generally available, temporary bottlenecks/slowdowns can occur that reduce data throughput somewhere between the streamer and the viewer. At times, these bottlenecks may cause the available bandwidth to fall below what is required for the preferred video quality. Such slowdowns can cause client video playing interruptions, including pausing of the video, rewinding of the video, and/or complete stoppage of the video playback. It would therefore be beneficial to support streaming of video content that tolerates temporary bandwidth bottlenecks.

BRIEF DESCRIPTION OF THE DRAWINGS

FIG. 4 illustrates an example manifest data corresponding to depicted received segment records.

DETAILED DESCRIPTION

The present technology relates generally to systems and methods for transmitting segment-quality units of a streaming video session to client computer(s). In one embodiment of the present technology, for example, a broadcast sender transmits streaming video over a network in response to a request from a client computer to view the streaming video session. The broadcast sender is configured to divide the streaming video session into a sequence of segments corresponding to different time portions of the video (for example, a sequence of 10 second segments, a sequence of 2 second segments, a sequence of scene segments, etc.), and transmits each segment at one or more quality levels corresponding to different required data transmission rates (for example, a highest quality level corresponding to 1.5 Mbps, an intermediate quality level corresponding to 750 kbps, and a lowest quality level at 300 kbps). As described herein, due to network conditions some of the segments at different quality levels (referred herein as "segment-quality units") may not be received or may be delayed in being received by an upload server. The system is configured to detect which segment-quality units are received by the upload server, and to update a manifest data structure that records the availability of the different segment-quality units. The client computer may then retrieve segment-quality units for playback of the streaming video according to the manifest data structure. As described herein, the system is configured to update the manifest data structure such that streaming of the video session at the client computer continues without interruption even when segment-quality units are not received.

These and other aspects of the technology will be described in greater detail below. Certain details are set forth in the following description and in FIGS. 1-4 provide a thorough understanding and an enabling description of various embodiments of the technology. One skilled in the art will understand, however, that the technology may be practiced without many of these details. Additionally, some well-known structures or features may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the technology.

Figure 1:
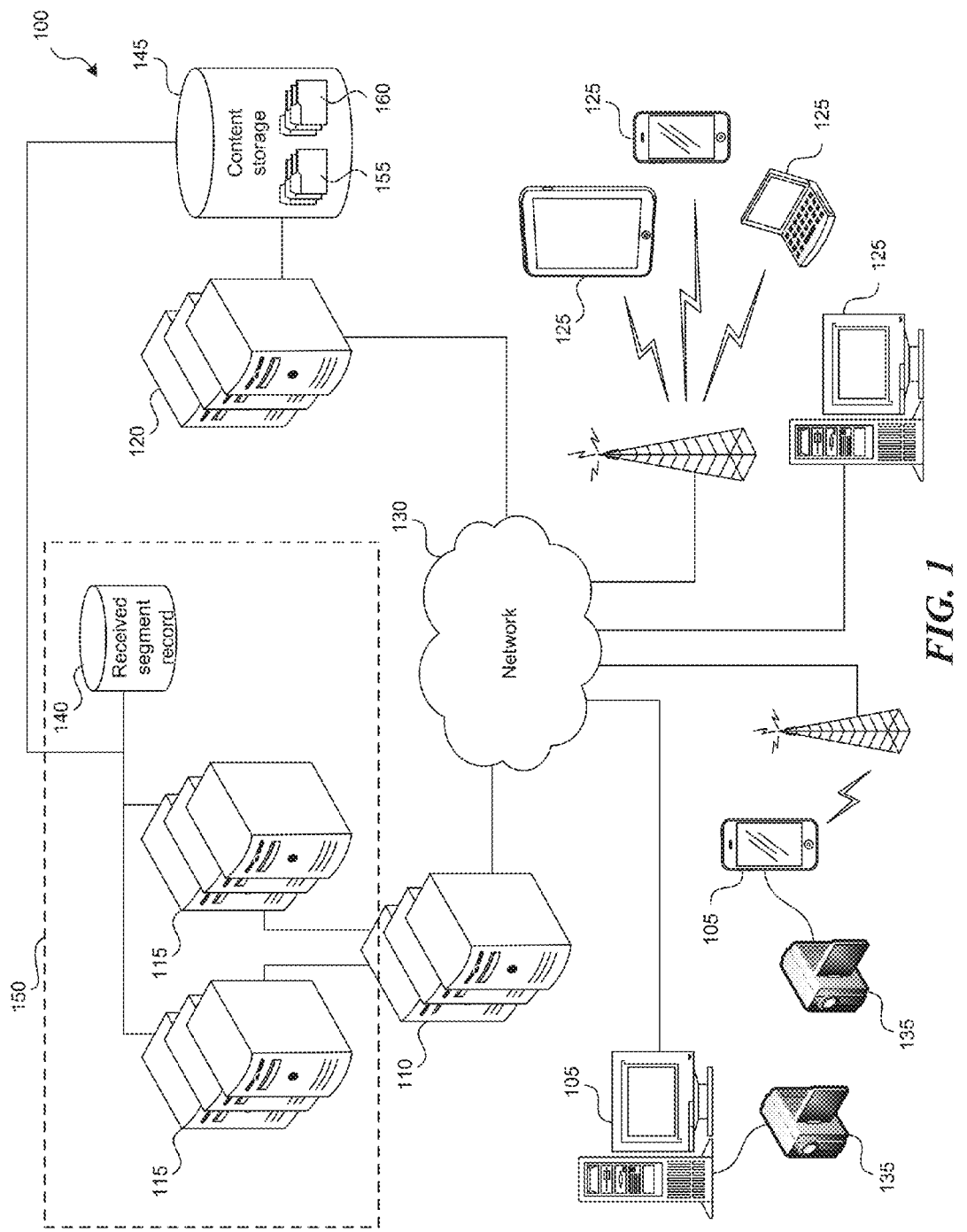
FIG. 1 is a diagram of an example environment in which a system for transmitting segment-quality units of a streaming video session may operate.

FIG. 1 and the following discussion provide a brief, general description of a suitable environment in which a system to transmit segment-quality units of a streaming video session may be implemented. Although not required, aspects of the technology are described in the general context of computer-executable instructions, such as routines executed by a general-purpose computer, a personal computer, a server, or other computing system. The technology can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the technology described herein may be stored or distributed on tangible, non-transitory computer-readable media, including magnetic and optically readable and removable computer discs, stored in firmware in chips (e.g., EEPROM chips). Alternatively, aspects of the technology may be distributed electronically over the Internet or over other networks (including wireless networks). Those skilled in the relevant art will recognize that portions of the technology may reside on a server computer, while corresponding portions reside on a client computer.

Suitable Environments and Systems

FIG. 1 illustrates a representative environment 100 in which aspects of the described technology may operate. The environment 100 includes, for example, one or more broadcast senders 105, a load balancer 110, one or more upload servers 115, a content server 120, and one or more broadcast viewing devices 125. The broadcast senders 105, load balancer 110, broadcast viewing device(s) 125, and servers 115, 120 communicate with each other through network(s) 130 including, for example, the Internet. The broadcast senders 105 and broadcast viewing devices 125 may communicate wirelessly with a base station or access point using a wireless mobile telephone standard, such as the Global System for Mobile Communication (GSM), or another wireless standard, such as IEEE 802.11, and the base station or access point communicates with the load balancer 110 and servers 115 and 120 via the network 130. Aspects of a segment-quality transmission system 150 may be practiced by the one or more upload servers 115 that maintain a received segment record 140, as illustrated. In other embodiments, however, the segment-quality transmission system 150 may be additionally practiced by one or more of the broadcast senders 105, the load balancer 110, the one or more upload servers 115, the content server 120, and the one or more broadcast viewing devices 125. In further embodiments, the segment-quality transmission system 150 may be practiced by components other than the one or more upload servers 115.

As illustrated, broadcast sender(s) 105 transmit streaming video over the network 130 to one or more upload servers 115. A broadcast sender 105 may be a mobile device, such as a mobile phone or tablet computer, connected to the network 130 through a wireless connection. A broadcast sender 105 may also be a desktop or other computer connected to the network 130 through a wired connection. Each broadcast sender 105 may transmit a different streaming video session being recorded at a recording device 135, in communication with the broadcast sender 105, substantially concurrently with the transmission of the video (i.e., live video streaming). Alternatively, the streaming video session may have been recorded previously and transmitted by the broadcast sender 105 from a stored copy. The broadcast sender 105 may transmit the streaming video session over the network 130 in response to receiving a viewing request or prior to receiving such request.

Prior to transmission, the broadcast sender 105 divides the streaming video into a plurality of segments (e.g., segment 1, segment 2, etc.) corresponding to different time portions of the video (for example, a sequence of 10 second segments, a sequence of 2 second segments, a sequence of scene segments, or a group of picture (GOP) length segments). To account for the variability of conditions along the network 130 to the broadcast viewing devices 125, the broadcast sender 105 also encodes each of the video segments at a plurality of quality levels, where each quality level corresponds to a required data transmission rate. For example, each segment may be encoded at a highest quality level corresponding to 1.5 Mbps, an intermediate quality level corresponding to 750 kbps, and a lowest quality level at 300 kbps.

The broadcast sender 105 attempts to transmit each of the quality levels for each video segment (referred herein as "segment-quality units") over the network 130. That is, if the broadcast sender 105 encodes a segment at three quality levels, it may attempt to transmit segment 1 at the three quality levels, segment 2 at the three quality levels, etc. Alternatively, the broadcast sender 105 may transmit fewer than all of the segment-quality units for a segment based on a heuristic. For example, the broadcast sender 105 heuristic may determine that the broadcast sender transmits segment 1 at the three quality levels, but transmits only one quality level (e.g., the lowest) for segment 2. The heuristic may then determine that the broadcast sender 105 transmit segment 3 at the three quality levels. The segment-quality units transmitted by the broadcast sender 105 may include metadata such as an identifier of the streaming video session, a segment number, and a quality level.

The segment-quality units transmitted by the broadcast sender 105 are uploaded to one or more upload servers 115 via the network 130. When there are more than one upload servers 115, the load balancer 110 may select the upload server 115 to which segment-quality units from the broadcast sender 105 should be transmitted given the current conditions of the network 130. The upload server 115 may provide certain processing on the segment-quality units, such as format changing. Although two upload servers 115 are shown in FIG. 1, it will be appreciated that more or fewer upload servers 115 may be utilized by the system 150. For example, an embodiment of the system 150 can operate with a single upload server 115, though as the number of broadcast senders 105 and broadcast viewing devices 125 increase, the system 150 may need to be scaled to include additional upload servers 115.

As segment-quality units are transmitted to the one or more upload servers 115, the upload servers 115 determine which segment-quality units were received for a streaming video session. Based on this determination, the upload servers 115 update the received segment record 140, which may be maintained in the form of a non-transitory computer-readable medium storing a database. For example, as illustrated in FIGS. 2 and 4 and described herein, the received segment record 140 includes a record associated with each of the plurality of segment-quality units for a streaming video session that indicates whether or not the associated segment-quality unit was received by at least one of the upload servers 115.

Figure 2:
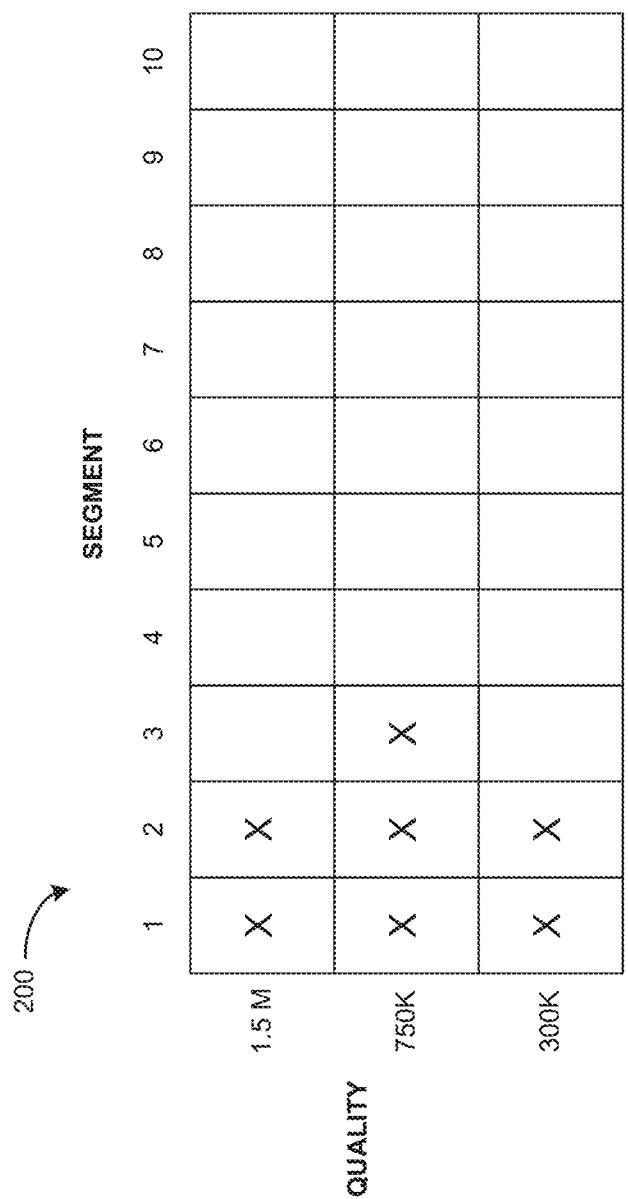
FIG. 2 is a diagram depicting a visualization of an example received segment record used by the segment-quality unit transmission system.

FIG. 2 illustrates an example received segment record 200. The received segment record 200 records which segment-quality units of a streaming video session have been received by the upload server 115. As illustrated in FIG. 2, records for ten segments of the streaming video session (i.e., segments 1-10) are shown. As described herein, each segment corresponds to a divided portion of the streaming video session. In this embodiment, for example, the streaming video session is encoded at three different quality levels (e.g., 1.5 Mbps, 750 kbps, 300 kbps), and thus the received segment record 200 includes a record for each of the three quality levels at each segment. In other embodiments, however, the received segment record 200 may include additional entries, depending on the number of segments into which the streaming video session was divided and the number of available quality levels. As illustrated in FIG. 2, the received segment record 200 may include an "X" at each segment-quality unit that has been received by an upload server. That is, in the example depicted in FIG. 2, an upload server has received segment-quality units for all three quality levels of segment 1 and segment 2, and a segment-quality unit for one quality level of segment 3, but no segment-quality units for additional segments. Though not shown, the received segment record may also include certain metadata for the segment-quality units, such as an identification of the streaming content, the segment number, the quality level, the location (e.g., a particular upload server, a cloud repository location) of the segment-quality unit, and a key for accessing the segment-quality unit. Though illustrated as a table in which columns represent segments of the streaming video session and rows represent quality levels, the received segment record may be maintained in other forms.

Referring to FIGS. 1 and 2 together, due to dynamic conditions such as over the network 130, or during communication with the broadcast sender 105 or with the load balancer 110, segment-quality units transmitted by the broadcast sender may be delayed or not received by the upload server 115 to which the segment-quality unit was transmitted. For example, a segment-quality unit (e.g., high quality level for segment 3) may be received by a first upload server in substantially real-time, while a segment-quality unit for a prior segment (e.g., medium quality level for segment 2) may experience significant delay before being received by the first upload server. As a further example, the segment-quality unit may never be received by the first upload server. As a still further example, a segment-quality unit for a later segment (e.g., low quality level for segment 4) may be received by a second upload server without any delay. When more than one upload servers 115 are used, the received segment record 140 may be shared by the one or more upload servers 115, such that the received segment record reflects a "merge" of the segment-quality units received at each of the upload servers. That is, if the segment-quality unit is received by at least one upload server 115, the received segment record 140 may indicate that the associated segment-quality unit has been received.

After processing, the upload server(s) 115 transmit the received segment-quality units to a content storage 145, where the units are stored in a segment-quality unit storage 155. The upload server(s) 115 also transmit updates regarding availability of the segment-quality units to a manifest data 160 stored as part of the content storage 145. The manifest data 160, in addition to indicating the availability of segment-quality units to broadcast viewing devices 125, also contains a pointer or index to the location in the segment-quality unit storage 155 where the corresponding segment-quality unit may be found. As described herein, the system generates updates to the manifest data 160 that accounts for segment-quality units not being received by the upload servers 115 while still providing smooth video playback. For example, the system compensates for missing segment-quality units by performing interpolation and/or filling segment gaps by generating manifest data that points or indexes to alternative segment-quality units in place of the missing segment-quality units.

The content storage 145, including the segment-quality unit storage 155 and manifest data 160, may be accessible to users through a content server 120. The content server 120 and content storage 145 may be provided by a third-party cloud storage provider, such as Amazon Simple Storage Service (Amazon S3). In other embodiments, however, the content server 120/content storage 145 may have a different arrangement.

When a user at a broadcast viewing device 125 wishes to access streaming content, the broadcast viewing device accesses the content storage 145 via the content server 120 to retrieve segments from the segment-quality unit storage 155 and the manifest data 160. The content server 120 delivers streaming content via a protocol, such as a standard HTTP protocol over the Internet or over a private network. The content server 120 and broadcast viewing device 125 can utilize an HTTP Live Streaming (HLS) system, an MPEG DASH streaming system, or other suitable live streaming system. Though not illustrated in FIG. 1, in some embodiments the segment-quality units and manifest data 160 of content storage 145 may be provided to the broadcast viewing device 125 through a content data network (CDN). The broadcast viewing device 125 may use the retrieved manifest data 160 to determine which segment-quality units for the streaming video session are available in the segment-quality unit storage 155, and retrieves segment-quality units accordingly. As described previously, the streaming video session is divided into a plurality of segments. The broadcast viewing device 125 may retrieve segment-quality units from the content server 120 and content storage 145 in a sequential order (i.e., segment 1, then segment 2, then segment 3, etc.). Alternatively, the broadcast viewing device 125 may retrieve the segments in non-sequential order, in which case the broadcast viewing device 125 may store and re-arrange the segment-quality units into sequential order before displaying the streaming video session to the user. Based on the retrieved segment-quality units and manifest data, the broadcast viewer can display the requested streaming video.

Method for Updating Manifest Data

Figure 3:
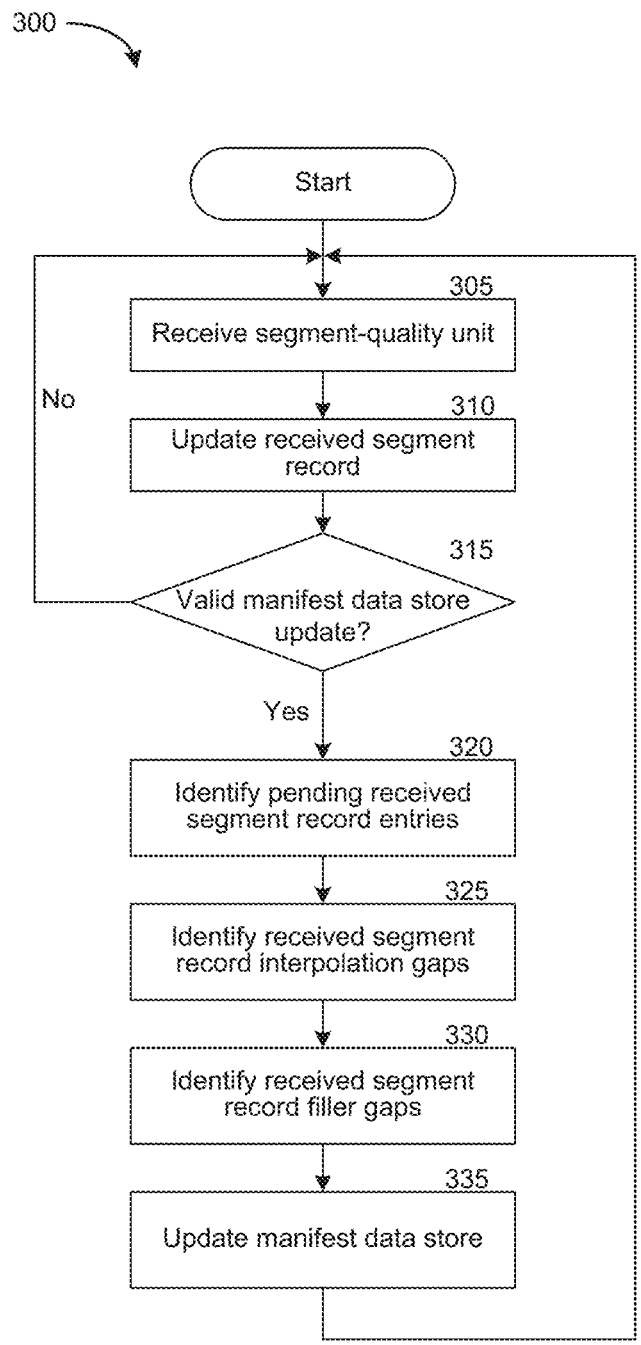
FIG. 3 is a flowchart illustrating an example process for generating manifest data for the streaming video based on the received segment-quality units.

FIG. 3 illustrates an example process 300, implemented by the segment-quality unit transmission system 150 (FIG. 1) or another suitable system, for receiving segment-quality units (such as from a broadcast sender) and updating manifest data. Beginning at block 305, for example, the segment-quality unit transmission system receives a segment-quality unit, from a broadcast sender, corresponding to a segment of a streaming video and a quality level at which the segment is encoded.

At block 310 the system updates a received segment record based on the received segment quality units. The received segment record includes a record associated with each of the segment-quality units that indicates whether the associated segment-quality units has been received by the system. As described herein, received segment-quality units, though indicated as received in the received segment records, are not necessarily immediately indicated as available to users of the system (e.g., content servers, broadcast viewing devices, etc.) via the manifest data store.

At decision block 315, the system determines, based on the received segment record and the received segment-quality unit, whether to perform a manifest data store update. Until a segment-quality unit is indicated as available in the manifest data store, broadcast viewing devices will not be able to utilize the segment-quality unit even if the segment-quality unit is actually present in the content storage. As described herein, applying heuristics to determine when to perform a manifest data update provides for improved handling of missing segment-quality units during video streaming. Specifically, the heuristics may prevent out-of-order segment-quality units from appearing available. As one example, the heuristic may determine that there is a valid manifest data store update if the segment corresponding to the received segment-quality unit is marked as "complete" in the updated received segment record (i.e., for all quality levels at which the segment was encoded, the corresponding segment-quality units have been received and marked in the received segment record). For example, if a segment was encoded at three quality levels (e.g., low, medium, and high), the received segment record indicates that two quality levels for the segment (e.g., low and high) were previously received, and the segment-quality unit for the third quality level (e.g., medium) is received at block 305, then the segment is complete and the heuristic may indicate that there should be a manifest data store update.

As a further heuristic example, the heuristic may determine that there is a valid manifest data store update if a segment-quality unit already been received for the next segment. For example, if a segment-quality unit for segment 4 is received at block 305, and the received segment record indicates that a segment-quality unit for segment 5 has previously been received, then the heuristic may indicate that there should be a manifest data store update, even if neither segment 4 nor segment 5 are complete. Both recited heuristic examples, as well as other heuristics, may be used at decision block 315. If based on the heuristic the decision block 315 determines a manifest data store update should not be performed, processing returns to block 205 to wait for the next segment-quality unit. If decision block 315 determines a manifest data store update should be performed, processing continues to block 320.

At block 320, the system identifies any segment-quality units marked as received in the received segment record for which a corresponding manifest data store update is pending. For example, segment-quality units may have previously been received but it at that time it was determined not to perform an update. In some embodiments, the system may only identify pending segment-quality units corresponding to segments prior to the segment corresponding the segment-quality unit received at block 305. In some embodiments, the system may only identifying pending segment-quality units corresponding to segments prior to the highest-numbered segment for which a manifest data store update has already occurred.

At block 325, for the segments corresponding to the segment-quality units identified at block 320 (i.e., the segments for which there will be a manifest data store update), the system identifies any "interpolation gaps" in the received segment records. Interpolation gaps are missing segment-quality units for segments that have at least one received segment-quality unit in the received segment record. For example, assuming encodings at three levels (high, medium, and low), then if a segment-quality unit has been received for the "low" quality level of a segment but not "high" and "medium", then the missing two segment-quality units would be identified as interpolation gaps. In order to improve playback, interpolation gaps may be filled, during the manifest data store update, with other segment-quality units of the same segment. That is, continuing with the previous example, the system updates the manifest data store for the segment to indicate that "high" and "medium" quality levels for the segment are available, but with the manifest data store indexing to the "low" quality segment-quality unit for the segment. By doing so, broadcast viewing devices attempting to retrieve the video stream at the "high" or "medium" quality level maintain smooth and uninterrupted playback, though with a momentary use of a "low" quality segment-quality unit. Because this interpolation is performed by the system through its generation of manifest data store updates, no special handling is required at the broadcast viewing device to use the interpolated and available segment-quality unit.

At block 330, for the segments prior to (i.e., having a lower-ordered segment number) than the segments identified in blocks 320 and 325, the system identifies any "filler gaps" in the received segment records. Filler gaps are segments for which no segment-quality units have been received. For example, if the system will be updating the manifest data store to indicate availability of received segment-quality units for segments 4 and 5 (including interpolation segment-quality units), but the received segment record shows no segment-quality units have been received for segment 3, then segment 3 would be identified as a segment having a filler gap. In order to improve playback, filler gaps may be filled, during the manifest data store update, with filler segment-quality units. For example, the system may prepare in advance a filler segment-quality units have a static image and no audio, and may store the filler segment-quality unit at the content storage. Alternatively, the system may generate the filler segment-quality unit when a filler gap is identified and transmit the filler segment-quality unit to the content storage at that time. The system then updates the manifest data store for all quality-levels of the segment to index to the filler segment-quality unit. By doing so, broadcast viewing devices continue playback of the video stream even though no segment-quality units were received for a segment. A filler segment-quality units may cause the display of a blank screen. Alternatively, a filler segment-quality unit may cause the display of a message to the user.

At block 335, the system updates the manifest data store to include the identified pending segment-quality units, the interpolation segment-quality units, and the filler segment-quality units. Processing then returns to block 305, to wait for the next received segment-quality unit.

Because the manifest data store is updated nearly concurrently (depending on the employed heuristics) with the segment-quality units being received at the upload server, segments will appear available to broadcast viewing devices referencing the manifest data store as segment-quality units are received (i.e., before the entire video has been recorded and uploaded). That is, streaming video upload by a broadcast sender and streaming video retrieval by a broadcast viewing device may occur concurrently. Furthermore, the use of interpolation and gap filling in the manifest data store is expected to improve playback of the streaming video when segment-quality units are lost or delayed.

In some embodiments, a segment-quality unit may be received at block 305 that was previously received and recorded in the received segment record and the manifest data store. The newly received duplicate segment-quality unit may be discarded or may be used to overwrite the earlier received segment-quality unit. In some embodiments, where a segment-quality unit associated with a segment (e.g., segment 7) is received before any segment-quality units of any quality have been received for a prior segment (e.g., segment 6), then the newly received segment-quality will be recorded in the received segment records but will not be indicated as available in the manifest data store until at least one segment-quality unit for that prior segment has been received.

In some embodiments, after a streaming video session has ended, a broadcast sender 105 (FIG. 1) may provide the missing segment-quality units to the system to make the content available at previously unavailable quality levels for later download. The broadcast sender 105 requests data (e.g., a copy of the manifest data structure, a listing of the missing segment-quality units) from the manifest data 160 (FIG. 1). The broadcast sender 105 then transmits only the missing segment-quality units to the upload server(s) 115 (FIG. 1), obviating the need to resend segment-quality units that have already been received. The later uploaded segment-quality units along with the originally uploaded units can then be made available for download. A subsequent viewing by a user of the video stream would then be able to use the additionally received segment-quality units.

FIG. 4 illustrates an example received segment record 400 and a corresponding manifest data store 450. The received segment record is maintained by the system to record whether or not a segment-quality unit has been received by the system (e.g., at an upload server). The manifest data store may be maintained outside of the system, such as at a content server, and provides information to broadcast viewing devices regarding whether a segment-quality unit is available and its location (e.g., a directory location and filename of the segment-quality unit as stored in the content storage). The manifest data store is updated by the system, such as through example process 300. In the illustrated example of FIG. 4, an entry in the received segment record 400 is marked with an 'X' to indicate that the corresponding segment-quality unit has been received by the system. Entries in the manifest data store 450 contain the location being indexed to for the given entry. For example, "(1, 1.5M)" conveys that the entry indexes or points to the location of segment-quality unit for segment 1 encoded at 1.5 Mbps. As described herein, and illustrated in FIG. 4, entries in the manifest data store may be indicates to broadcast viewing devices as available even when the segment-quality unit has not been received, by using, for example, interpolation and gap filling.

In the example received segment record 400, all segment-quality units for segment 1 and segment 2 have been received by the system. The manifest data store 450 generated as a result shows indexes to the received segment-quality units for the corresponding entry. That is, the manifest data store 450 shows that the entry for segment 1 at 750 Kbps indexes to the segment-quality unit for segment 1 at 750 Kbps, the entry for segment 2 at 300 Kbps indexes to the segment-quality unit for segment 2 at 300 Kbps, and so on for segment 1 and segment 2. A broadcast viewing device using the manifest data store to playback a streaming video would retrieve the expected segment quality units.

The received segment record 400 further shows that segment-quality units for segment 3 have been received at 1.5 Mbps and 300 Kbps. As a result, the manifest data store 450 shows entries for segment 3 at 1.5 Mbps and 300 Kbps with indexes to the segment quality units for segment 3 at 1.5 Kbps, and 300 Kbps, respectively. In contrast, the received segment record 400 shows the segment-quality unit for segment 3 at 750 Kbps was not received by the system. In order to improve playback, the system performs interpolation as described herein. Accordingly, the manifest data store 450, at the entry for segment 3 at 750 Kbps, shows an index to the segment-quality unit for segment 3 at 300 Kbps. Thus, a broadcast viewing device attempting to retrieve the streaming video at 750 Kbps would see an available segment-quality unit for segment 3, and would retrieve the segment-quality unit at the indexed location. Because the entry indexes to the segment-quality unit for segment 3 encoded at 300 Kbps, the broadcast viewing device would retrieve a lower-quality segment-quality unit for the segment than it attempted to retrieve. However, by doing so, the playback of the streaming video continues smoothly, in spite of the missing segment-quality unit. Furthermore, since the use of the available lower-quality segment-quality unit, or interpolation, was performed through updates to the manifest data store, no special handling at the broadcast viewing device was required.

The received segment record 400 further shows no segment-quality units were received for segment 4. As described herein, the manifest data store may utilize filler segment-quality units for a segment when no segment-quality units were received for that segment. Accordingly, the manifest data store 450 shows "fill," or filler segment-quality units, for each of the entries for segment 4. Thus, a broadcast viewing device attempting to retrieve the streaming video would see that segment-quality units are available for each of the quality-levels at segment 4, but would retrieve a filler segment-quality unit. Though the retrieved filler segment-quality unit may only show a blank screen or message, for example, utilizing in the playback of the streaming video at the broadcast viewing device may still be preferable to interrupting or pausing the streaming video. Furthermore, no special handling at the broadcast viewing device was required to utilize the filler segment-quality units.

Conclusion

The above descriptions of examples of the disclosed technology are not intended to be exhaustive or to limit the disclosed technology to the precise form disclosed above. While specific embodiments of, and examples for, the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A computer-implemented method for providing streaming video to a client computer, the method comprising:
maintaining, at a computing system, a received segment record comprised of indications of segment-quality units that have been received and that have not been received by the computing system, wherein each segment-quality unit corresponds to a segment of a streaming video and a quality level at which the segment is encoded, and wherein indicating a segment-quality unit as received in the received segment record does not make the segment-quality unit available to the client computer;
receiving, at the computing system, segment-quality units from a broadcast sender;
updating, at the computing system, the received segment record based on the received segment-quality units to generate an updated received segment record;
determining, based on the updated received segment record, whether to update a streaming video manifest, wherein the streaming video manifest indicates the availability and location of segment-quality units of the streaming video to the client computer; and
updating, based on the determining, the streaming video manifest based on the updated received segment record of segment-quality units, wherein updating the streaming video manifest comprises:
identifying a completed segment in the updated received segment record, wherein the completed segment comprises received segment-quality units for all of the quality levels of the completed segment, wherein the received segment-quality units of the completed segment have not been indicated as available in the streaming video manifest;
identifying an interpolation segment in the updated received segment record, wherein the interpolation segment comprises:
(a) at least one segment-quality unit that has been received, wherein the at least one segment-quality unit that has been received has a first quality level of the interpolation segment, and
(b) at least one other segment-quality unit that has not been received, wherein the at least one other segment-quality unit that has not been received has a second quality level of the interpolation segment, and wherein the at least one segment-quality unit that has been received of the interpolation segment has not been indicated as available in the streaming video manifest;
identifying a filler gap in the updated received segment record, wherein the filler gap comprises segments for which no segment-quality units have been received;
generating a manifest update, wherein the manifest update indicates to the streaming video manifest the availability of the received segment-quality units for all of the quality levels of the completed segment, a filler segment-quality unit for a quality level of the filler gap, the at least one segment-quality unit that has been received of the interpolation segment, and the at least one other segment-quality unit that has not been received of the interpolation segment, wherein the availability of the at least one other segment-quality unit that has not been received indexes to an interpolation segment-quality unit, and
transmitting the manifest update to the streaming video manifest, and
wherein the manifest update causes the received segment-quality unit in the updated received segment record to appear available to the client computer.

2. The method of claim 1 wherein the at least one segment-quality unit that has been received of the interpolation segment corresponds to a lower quality level than the quality level of the at least one other segment-quality unit that has not been received of the interpolation segment.

3. The method of claim 1, wherein the manifest update indicates the availability of all quality levels of the filler gap.

4. The method of claim 1 wherein the filler segment-quality unit encodes a static image.

5. The method of claim 1, further comprising:
transmitting, to the broadcast sender, an indication of segment-quality units that were not received based on the received segment record; and
receiving, based on the transmitted indication, at least one segment-quality unite previously indicated as not received.

6. The method of claim 1 wherein the computing system is a first computing system, and wherein the streaming video manifest is maintained at a second computing system, wherein the second computing system is different from the first computing system.

7. The method of claim 1 wherein segments of the streaming video are ten seconds or less in length.

8. The method of claim 1 wherein the segment-quality units are received while the streaming video is being recorded by a recording device.

9. The method of claim 1 further comprising transmitting the received segment-quality units to a hypertext transfer protocol (HTTP) server.

10. The method of claim 1 further comprising transmitting the received segment-quality units to a content distribution network (CDN).

11. The method of claim 1 wherein the streaming video is provided according to an HTTP live streaming (HLS) or MPEG dynamic adaptive streaming over HTTP (DASH) streaming protocol.

12. A non-transitory computer-readable medium encoded with instructions that, when executed by a processor, perform a method for providing streaming video to a client computer, the method comprising:
maintaining, at a computing system, a received segment record comprised of indications of segment-quality units that have been received and that have not been received by the computing system, wherein each segment-quality unit corresponds to a segment of a streaming video and a quality level at which the segment is encoded, and wherein indicating a segment-quality unit as received in the received segment record does not make the segment-quality unit available to the client computer;
receiving, at the computing system, segment-quality units from a broadcast sender;
updating, at the computing system, the received segment record based on the received segment-quality units to generate an updated received segment record;
determining, based on the updated received segment record, whether to update a streaming video manifest, wherein the streaming video manifest indicates the availability and location of segment-quality units of the streaming video to the client computer; and
updating, based on the determining, the streaming video manifest based on the updated received segment record of segment-quality units, wherein updating the streaming video manifest comprises:

identifying a completed segment in the updated received segment record, wherein the completed segment comprises received segment-quality units for all of the quality levels of the completed segment, wherein the received segment-quality units of the completed segment have not been indicated as available in the streaming video manifest;

identifying an interpolation segment in the updated received segment record, wherein the interpolation segment comprises:
   (a) at least one segment-quality unit that has been received, wherein the at least one segment-quality unit that has been received has a first quality level of the interpolation segment, and
   (b) at least one other segment-quality unit that has not been received, wherein the at least one other segment-quality unit that has not been received has a second quality level of the interpolation segment, and wherein the at least one segment-quality unit that has been received of the interpolation segment has not been indicated as available in the streaming video manifest;

identifying a filler gap in the updated received segment record, wherein the filler gap comprises segments for which no segment-quality units have been received;

generating a manifest update, wherein the manifest update indicates to the streaming video manifest the availability of the received segment-quality units for all of the quality levels of the completed segment, a filler segment-quality unit for the filler gap, the at least one segment-quality unit that has been received of the interpolation segment, and the at least one other segment-quality unit that has not been received of the interpolation segment, wherein the availability of the at least one other segment-quality unit that has not been received indexes to an interpolation segment-quality unit, and transmitting the manifest update to the streaming video manifest, and wherein the manifest update causes the received segment-quality unit in the updated received segment record to appear available to the client computer.

13. The non-transitory computer-readable medium of claim 12 wherein the manifest update indicates the availability of all quality levels of the filler gap.

14. The non-transitory computer-readable medium of claim 12, further comprising:
   transmitting, to the broadcast sender, an indication of segment-quality units that were not received based on the received segment record; and
   receiving, based on the transmitted indication, at least one segment-quality units previously indicated as not received.

* * * * *

UNITED STATES PATENT AND TRADEMARK OFFICE
CERTIFICATE OF CORRECTION

PATENT NO. : 9,794,604 B2
APPLICATION NO. : 14/942917
DATED : October 17, 2017
INVENTOR(S) : Hiroshi Ohno et al.

It is certified that error appears in the above-identified patent and that said Letters Patent is hereby corrected as shown below:

In the Specification

In Column 9, Line 51, delete "Kbps," and insert -- Mbps, --, therefor.

In the Claims

In Column 12, Line 18, in Claim 5, delete "unite" and insert -- unit --, therefor.

Signed and Sealed this
Twentieth Day of March, 2018

Andrei Iancu
*Director of the United States Patent and Trademark Office*